United States Patent [19]
Morrissey et al.

[11] Patent Number: 5,403,498
[45] Date of Patent: Apr. 4, 1995

[54] GRAY WATER REUSE CONTROL SYSTEM

[75] Inventors: Alan P. Morrissey; James E. Bowers, both of Augusta, Mich.

[73] Assignee: Econeco Inc., Augusta, Mich.

[21] Appl. No.: 52,776

[22] Filed: Apr. 26, 1993

[51] Int. Cl.$^6$ ............................................. B01D 37/04
[52] U.S. Cl. ................... 210/767; 210/136; 210/138; 210/141; 210/257.1; 210/332; 210/335; 210/418
[58] Field of Search ............... 210/86, 106, 108, 109, 210/110, 117, 121, 123, 124, 128, 134, 136, 138, 141, 143, 167, 196, 248, 257.1, 258, 333.1, 411, 416.1, 332, 335, 340, 418, 791; 4/665

[56] References Cited

U.S. PATENT DOCUMENTS

| | | | |
|---|---|---|---|
| 3,112,497 | 12/1963 | Call | 4/665 |
| 3,188,656 | 6/1965 | Drager | 4/366.5 |
| 3,318,449 | 5/1967 | Jennings et al. | 210/104 |
| 3,543,294 | 11/1970 | Boester | 210/220 |
| 3,594,825 | 7/1971 | Reid | 4/665 |
| 3,915,857 | 10/1975 | Olson | 210/104 |
| 4,162,218 | 7/1979 | McCormick | 210/104 |
| 4,197,597 | 4/1980 | Toms | 4/300 |
| 4,358,864 | 11/1982 | Medrano | 4/665 |
| 4,704,202 | 11/1987 | Poyner | 210/333.1 |
| 4,786,420 | 11/1988 | Dalessandro | 210/332 |
| 4,924,536 | 5/1990 | Houghton | 4/665 |
| 4,986,905 | 1/1991 | White | 210/104 |
| 5,035,011 | 7/1991 | Rozenblatt et al. | 4/665 |
| 5,059,330 | 10/1991 | Burkhardt | 210/744 |
| 5,106,493 | 4/1992 | McIntosh | 210/167 |
| 5,114,586 | 5/1992 | Humphrey | 210/606 |
| 5,160,606 | 11/1992 | De Simone et al. | 210/110 |
| 5,173,180 | 12/1992 | Stewart et al. | 210/167 |
| 5,254,246 | 10/1993 | Rivelli et al. | 210/333.1 |
| 5,298,162 | 3/1994 | Niederer et al. | 210/418 |

OTHER PUBLICATIONS 1 page sketch of the type of gray water treatment system which we are informed is in use in California, U.S.A., date unknown.

Primary Examiner—Joseph W. Drodge
Attorney, Agent, or Firm—John T. Reynolds

[57] ABSTRACT

This invention provides an automatically controllable water reuse system having, in combination, a) a reservoir for water to be reused, b) a switch for controlling the level of water in said reservoir, c) an electrically powered timing mechanism which controls in a timed relationship filtering and pumping apparatus which can be turned "on" by a water level switch in the reservoir. The timer, pumping, filtering, and valve control combination is timed to provide at least four modes of operation including first and second modes to clean moveable solids from first and second filters, a third mode to pump filtered water for reuse to end points of use, e.g. to a toilet water storage tank or to garden irrigation end points and a fourth mode providing either a rest period before beginning the water pumping, filtering, distribution cycle again or for manual operation of the apparatus to direct the water for reuse to a desired reuse end-point. This apparatus provides a secondary pump/filter combination which is dedicated to the function of cleaning the primary filter in an automatic timed sequence.

10 Claims, 14 Drawing Sheets

GRAY WATER REUSE CONTROL SYSTEM

FIELD OF THE INVENTION

This invention relates to a water reuse control system applicable to a water reuse system of the type in which water derived from a prior point of use, often called "gray water" is normally discarded to waste disposal through a sewer line, septic tank system, or the like, but which water is still clean enough, optionally with some filtering, chlorinator and/or bacteriostat treatment, for reuse for some household, apartment, or commercial building toilet tank filling or irrigation purposes. More specifically, this invention provides a compact water clarification and reuse control system which (a) can be run automatically for extended periods of time without the need for short term manual filter cleaning, (b) does not require solid filter media or (c) does not risk coming into contact with clear potable water supplies.

BACKGROUND OF INVENTION

Gray water recovery and reuse devices have been in operation for many years. Recent events in the State of California and elsewhere have shown the need for legalization of gray water and its devices. Gray water recently became legal in the State of California and it was quickly realized that the devices would need to be fully automatic to be accepted by the consumers and the various health agencies involved with gray water. The devices would need to be fully automatic. After a pilot program, this fact became very obvious. Problems centered around the cleaning of the filter necessary to remove many of the particles from the gray water. The cleaning or even the discarding of the filter became a concern to the various health agencies and a nuisance to the consumer. It was also realized that in many future circumstances, the possibility existed that a home equipped with the ability to use gray water would fall into disuse by the new homeowners who would tire of the expense and problems associated with caring for a system which required the cleaning of the filters manually.

Our device has been designed with such thoughts in mind. The device can be operated as a fully automatic system. It uses two filters and two pumps. The filters do not need replenishing of the filter media. The two filters are backwashed automatically on a timed schedule and so do not require daily cleaning and maintenance. An annual inspection of the system is all that is required in the way of normal maintenance. Such a system will reduce the nuisance factor found in other systems which are not fully automatic, and eliminate the replenishing of the filter media in the systems which are fully automatic. It will reduce the concern of the various health agencies over the care and maintenance of other systems and the various potential health problems that may arise.

Searches of the prior art done for us by others uncovered the following United States patents as background.

| | | |
|---|---|---|
| Call | 3,112,497 | Water System |
| Drager | 3,188,656 | Apparatus . . . Waste Water |
| Jennings et al | 3,318,449 | Water Reuse System |
| Boester | 3,543,294 | Household . . . System |
| Reid | 3,594,825 | Water . . . System |
| Olson | 3,915,857 | Method . . . Conserving Water |
| McCormick | 4,162,218 | Water Reuse System |

-continued

| | | |
|---|---|---|
| Toms | 4,197,597 | Water . . . Solids . . . Removal |
| Medrosso | 4,358,864 | Combination . . . System |
| Houghton | 4,924,536 | System . . . Water . . . Building |
| White | 4,986,905 | Distribution . . . Irrigation |
| Rosenblatt et al | 5,035,011 | Self Draining . . . System |
| Burkhardt | 5,059,330 | Gray Water . . . Apparatus |
| Humphrey | 5,114,586 | Sanitation System |

In addition, we enclose a one sheet sketch of a type of gray water treatment system which we are informed is currently in use in California, U.S.A. To our knowledge, none of these above listed patents or references discloses or suggests the water reuse control system described and claimed herein.

SUMMARY OF THE INVENTION

Figure 1:
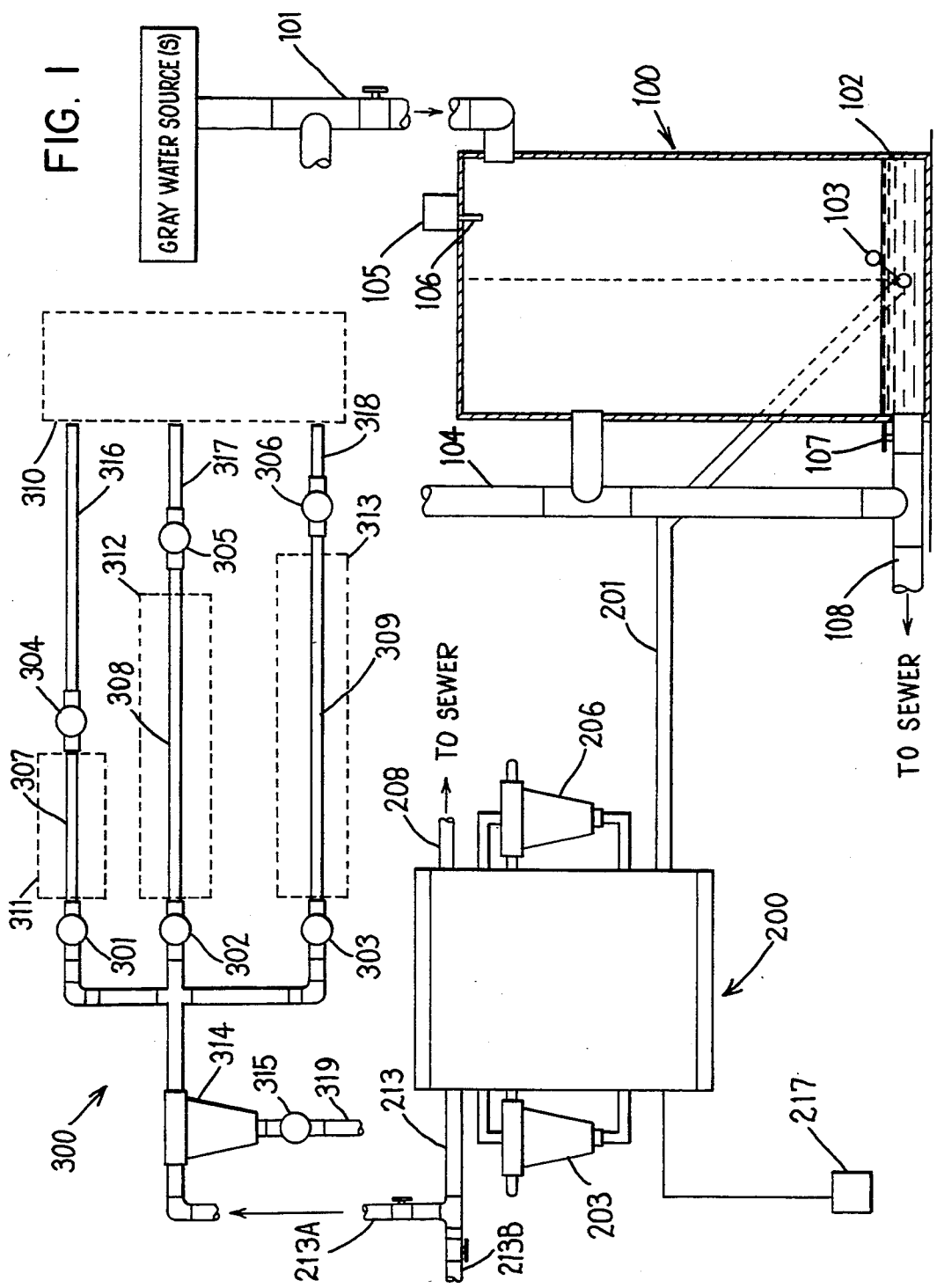
FIG. 1 is a diagram portrayal of a typical plumbing layout arrangement of components in a water reuse control system of the invention, showing generally the control box with its two filters set forth between a reservoir and an optional three line irrigation system.

Briefly, this invention provides an automatically controllable water reuse system comprising in combination a) a reservoir vessel or tanks for collecting and storing water to be reused, b) switch means for controlling the level of water in said reservoir, c) an electrically powered timing mechanism which is connected to and controls in a timed relationship filtering and dual motorized pumping apparatus which can be activated to an "ON" position by said switch associated with said reservoir water level, d) said timing mechanism control combination (c) also including water line and power controls for a second motorized pump means and a second filter means for the purpose of cleaning the primary filter in a timed powered sequence of the timing mechanisms, e) said electrically powered timer, filtering, pumping, and valve control combination having several automatically controllable modes, which modes, when said control combination has been activated to an "ON" or operating condition includes:

1) a first mode of operation which activates a first motorized pump means and a first powered valve means to draw previously used water from said reservoir through liquid holding conduits and check valve means connecting said reservoir and said first filtering and motorized pumping devices through said first filter to separate filterable solids from said first filtered reservoir water and then to draw such first filtered water via liquid conduits through the first motorized pump to transport said first filtered water through said first powered valve and then through a second filter to clean that second filter of previously collected filterable solids, said second filtered water containing any moveable filtered solids is diverted through liquid conduits and check valve means to waste disposal to complete the mode one operation;

2) a second mode of operation activated by timer advancement in which power is removed from said first motorized pump and first powered valve means, and power is sent to a second powered valve and a second motorized water pump to draw water from said reservoir through liquid conduit and check valve means and through said second filter to advance said second filter water through said second pump and through conduits connecting in line said second pump, and second powered valve means to said first filter to clean said first filter of filterable solids, from which first filter the effluent water filterable solid mixture is carried through liquid conduits and check valve means to waste disposal, to complete the mode 2 operation;

3) a third mode of operation activated by timer advancement in which power is removed from said second powered valve while said second motorized pump is still in operation to pump filtered water to reuse end points for a time and in an amount sufficient to complete its end use purpose, to complete said third mode of operation, and 4) a fourth mode of operation arrived at by timer advancement which removes power for said water reuse control system to allow an operation selected from the group consisting of 4a) a timed rest period before automatic operation of the water reuse control system operation is resumed by beginning said first mode of operation again, and 4b) manual, switch means activated, operation to allow for optional bypass of the timing mechanism operations to use said reservoir water for an extended selected operation purpose, e.g., irrigation of grass and/or flower gardens, or car washing.

This water reuse control system is intended primarily for use in automatically controlling the filtering and distribution of gray water optionally through conduits to toilet water closets for reuse of such water for flushing purposes or to irrigating one or more parts of a yard and/or garden or for other secondary use purposes as may be desired. The apparatus provided herewith also provides means for the automatic or manual draining of the reservoir to waste disposal when the reservoir water level reaches an indicated level.

Optionally, this water reuse control system can also be used to filter and return swimming pool and hot tub water to the respective pool or hot tub for reuse of the resulting filtered waters by the appropriate placement of the water conduits and check valve means between deeper locations of the pool or tub (reservoir) to the control system of this invention, and filtered water exit conduits back into the water level portions of said pool or tub, with provisions for timed or manual bypassing of water/filterable solid mixture to waste, as might be triggered by a filter pressure indicator device (or timing device).

The preferred switch means to activate the operation of the water reuse control system of this invention is a mercury switch arrangement mounted inside a float means located in the reservoir although other switch types such as opto-electronic/reed switch means and/or a pressure switch means could also be used.

In the water reuse control system of this invention the timing mechanism component can be designed to prevent the timing mechanism from operating outside of its pre-set sequence of modes of operation. However, we prefer to use a water reuse control system timing mechanism in which the time duration for each mode of operation in the time sequence of operation of the control system can be separately adjusted to vary the amount of time each mode of operation is to operate before proceeding or advancing to the next mode of operation in the control system cycle.

DETAILED DESCRIPTION OF THE INVENTION

The prior used water which is processed in the water reuse control system of this invention can be water derived from household type bathtub, shower, bathroom basin waters, clothes washing machines, but not generally dishwashers, kitchen sink drain water, and certainly not toilet flush waters. In extended uses of the water reuse control system of this invention, waters from recreational swimming pools, hot tubs and the like can also be drawn, filtered, pumped and returned to such sources, if desired. For convenience, all of these previous waters are collectively referred to herein as 'gray water', which are processed according to the invention in the herein described water reuse control system.

Also, as a convenience, motorized pumps 204 and 210 are often referred to as a single unit, which they are in application but to aid in description/function they should be thought of as consisting of a pump head (204,210) connected to a motor (505). In certain references, mention will be made of a motor 505. This type of motor is common to both types of pumps 204 and 210 (each pump having its own separate motor). The same is true of the type of pressure switch (501) used. Each pump has its own separate pressure switch (501) but they are of the same type and function in an identical manner. In FIGS. 2, 3–7, and 13 pump motor 505 is not shown but is considered a component of pumps 204 and 210, again, each pump having its own motor (505).

The graywater reuse control system of this invention is shown in the drawings and described herein as being used in the context of a family household sized unit with a connected set of components including gray water source liquid fluid lines 101 connected to a gray water reservoir tank 102. The reservoir tank 102 can be fitted, optionally with a bacteriostat or chlorinating unit 105 which would dispense bacteriostat or chlorinator chemical through dispenser 106 to the reservoir as needed or desired. The reservoir tank can optionally be fitted with a drain pipe 108 and valve 107 connected to vent line 104 for draining gray water directly to a waste line such as a sewer in the event that the reservoir becomes too full, or if it is desired to drain the reservoir tanks on a regular basis to maintain fresher reservoir gray water for reuse in the household system described herein. In general, when the gray water is being processed for reuse in our system, the control system 200 is turned "ON", and gray water is drawn from the reservoir tank 102 via line 201 into the "control" system of this invention (200) comprising powered and check valves, two pumps, two filters, liquid distributive lines and blocks in a timed control manner as illustrated in the drawing and then out to filtered gray water reuse lines as may be set or timed into the timing mechanism by the operator. Obviously, for treatment of larger capacity gray water reuse systems, such as might be needed for apartment buildings, office buildings, and the like, larger pump, filter and electrical capacity components may be needed.

The components of the control system used in the gray water reuse control system described herein are designed to run on about a 24 volt system which will require and include the use of a transformer (217) and electrical connection apparatus such as pin and cable connectors to adopt household electrical power supplies to operate the system. Other voltages can be used as well and if a 12 volt system is used, the system can be operated from an alternate power source such as a battery or any of the reusable energy sources such as solar power. The various components are available commercially in the United States. For example, the motorized pumps used in our control system are Model 2088-473-143 pumps available from Shurflo, of Santa Ana, Calif. The timer mechanism used herein was a Model No. 545-A07-187, available from the Cramer Co., of Old Saybrook, Conn. The solenoid valves used by us were Model No. L6034, available from Hardie Irrigation, Laguna Niguel, Calif. The check valves used in our system were obtained from Corr Tech Inc., Houston, Tex. The transformer unit we used for stepping down the household current was part no. 705-0690, available from Allied Electronics, Grand Rapids, Mich. The 2 pin connector device we used to connect the transformer to our control system as well as the float switch is part no. 14243, from L. S. Brown Co., Atlanta, Ga. The filter devices we used in constructing our device is part no. LGFP112ES4P, from Precision Fitting & Valve Co., of Minneapolis, Minn. The mercury switches are Part no. 3825 from Durakool Inc., Elkhart, Ind. The cork ball float is a part described as a 27/64" solid coated ball from Gerbert Ltd., Lancaster, Pa. Connecting these components are appropriate liquid conveyance tubes connected by appropriate clamps, in an arrangement as shown by the drawings.

Figure 6:
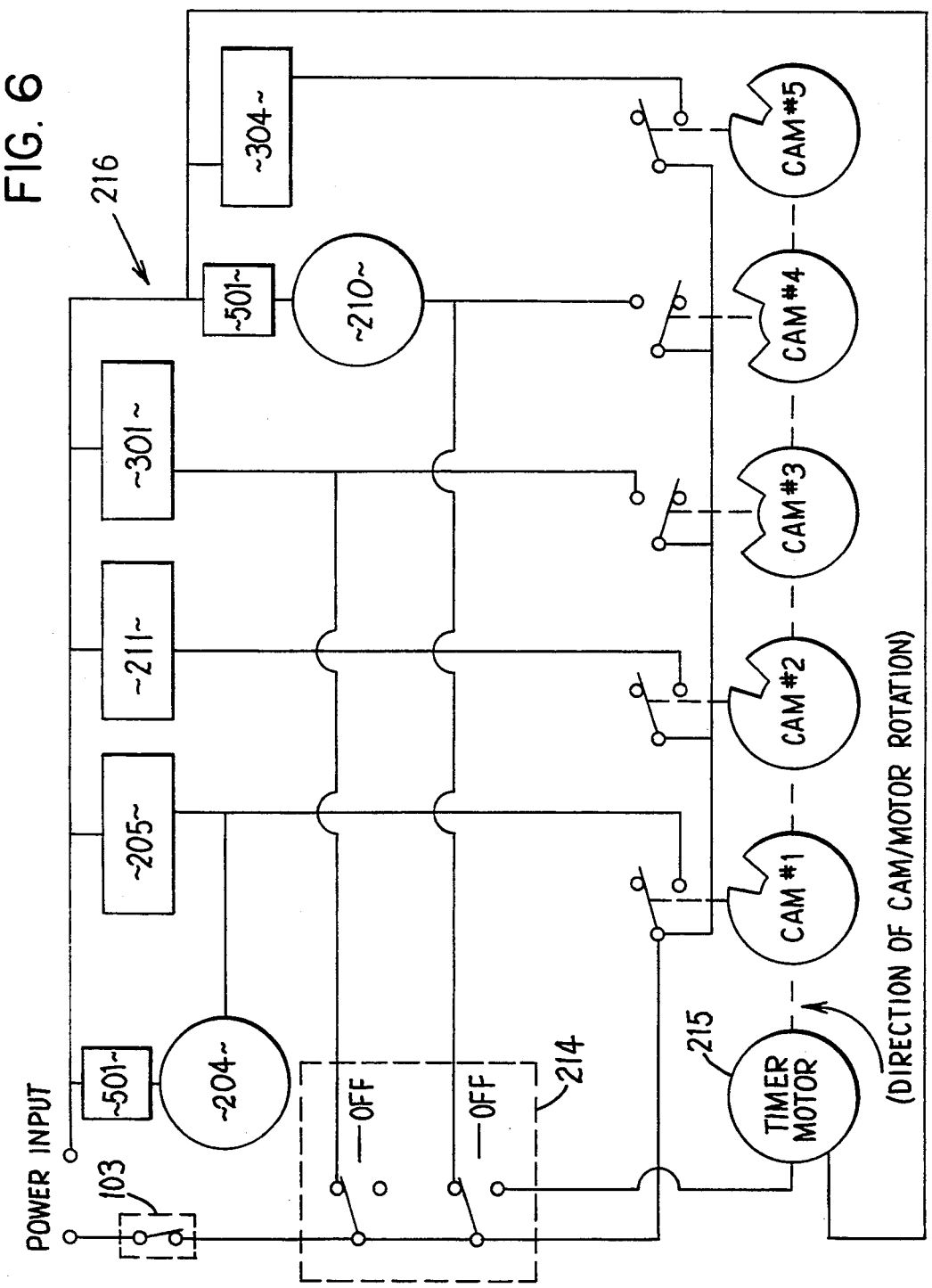
FIG. 6 is a diagram of electrical switch and cam wheel position of the timing mechanism of the invention control system when the control system is within its mode 4 stage.
Figure 7:
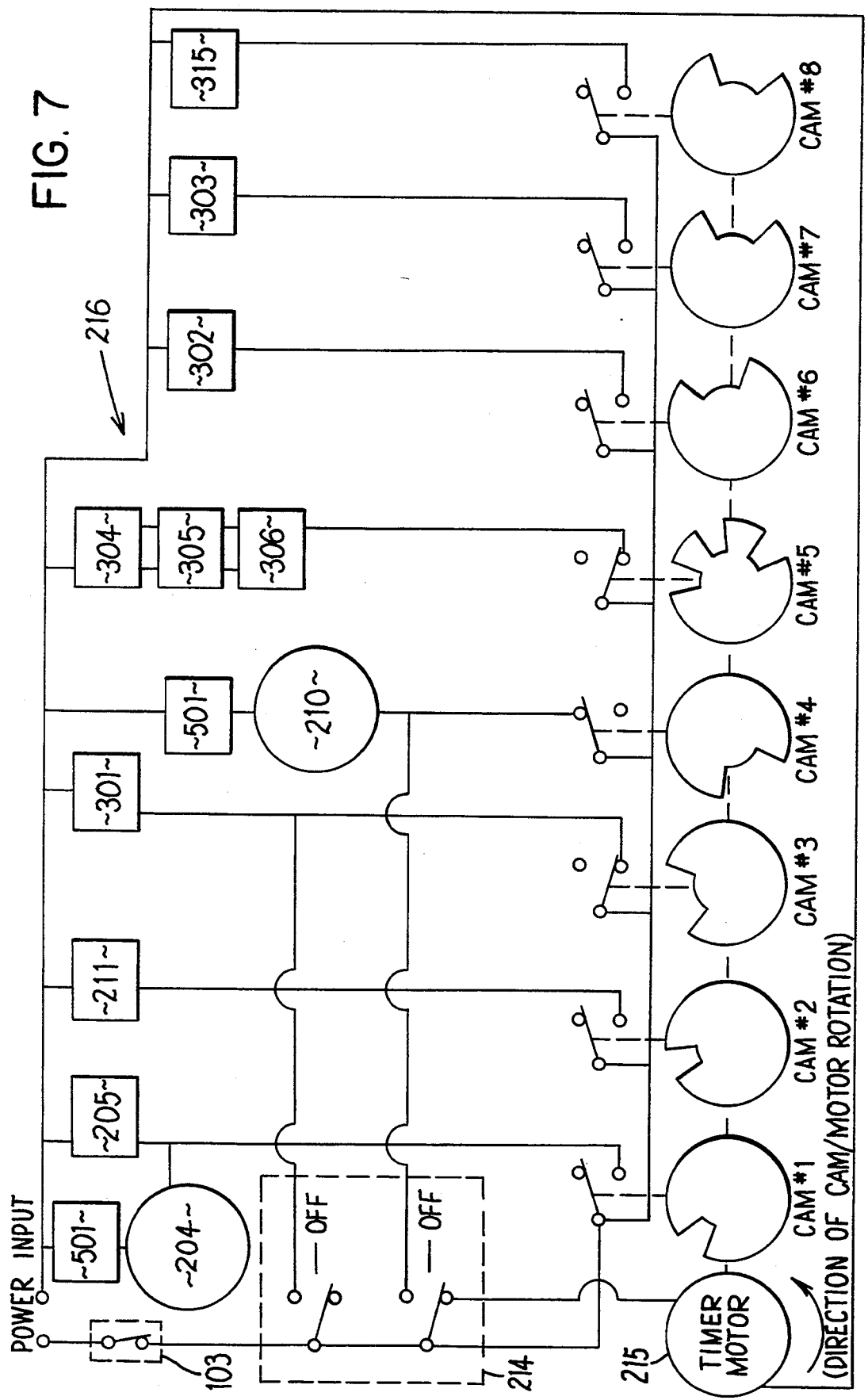
FIG. 7 is a diagram of electrical switch and optional additional cam settings in the timing mechanism of the invention control system for use with a multi zone water reuse distribution system.

The main part of the control apparatus of this invention is intended to operate the gray water treatment for reuse in four modes as described herein. However, additional optional controls are available with this unit. For example, FIG. 7 shows an optional arrangement for a control system in which 8 timing cams can be used. FIG. 7 illustrates only one of the four modes that the timing mechanism 216 is capable of performing. Many of the features are similar to those shown in FIGS. 3–6 and so are not repeated with further illustrations showing the other modes possible for the 8 cam arrangement. Cams 1 through 4 are designed to allow the control unit to function in modes 1 through 4. Cams 6 and 7 allow for the control of two additional solenoid valves, 302 and 303, which allow for two additional gray water use lines, e.g. for separate irrigation. Timer cam 5 is designed to operate solenoid valves 304,305, and 306 which function as drain valves for line 307,308, and 309, respectively. Timer cam 8 controls solenoid valve 315 and is designed to coordinate and allow for the backwashing of filter 314.

Figure 12:
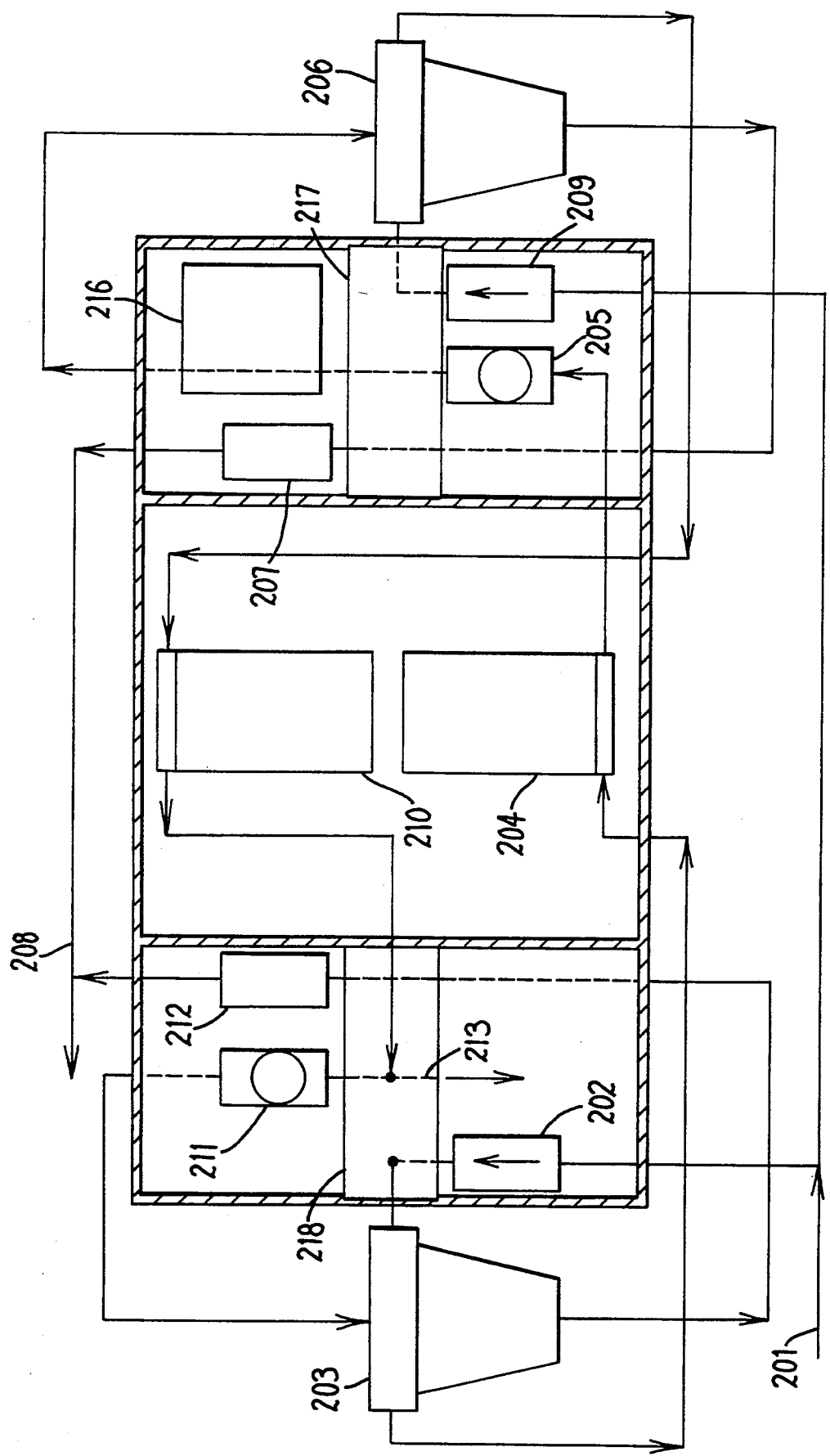
FIG. 12 is a plan view on the arrangement of components of a working model or example of the water reuse control system of this invention.
Figure 13:
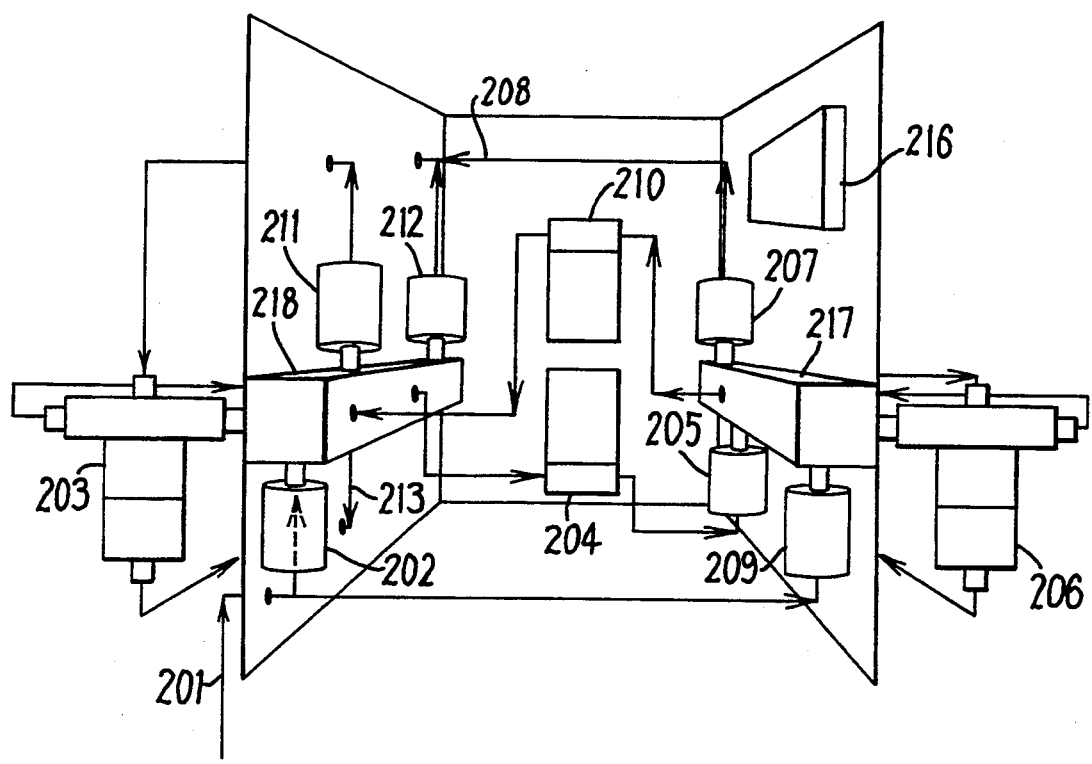
FIG. 13 is a diagram illustrating a presently preferred arrangement of component parts around and/or within a wall mountable control box for the various water transmission paths, filters, powered solenoid valves and pumps, check valves, and examples of practical reuses of the filtered water passing through said control system.

FIG. 13 is an illustration of the currently preferred control box arrangement of the solenoid valves, pumps, liquid distribution block parts, with the filters 203 and 206 shown on each side of the "control box" unit. As can be seen from the FIG. 13 illustration, the solenoid valves and check valves are connected to liquid distribution blocks 217 and 218 on each side panel of the control unit which distribution blocks and side panel also act as rigid mounts for the various components as well as conduit means in a compact box or unit for the treatment and directing of the filtered gray water. This FIG. 13 is a presently preferred arrangement of parts shown in FIG. 12.

Figure 14:
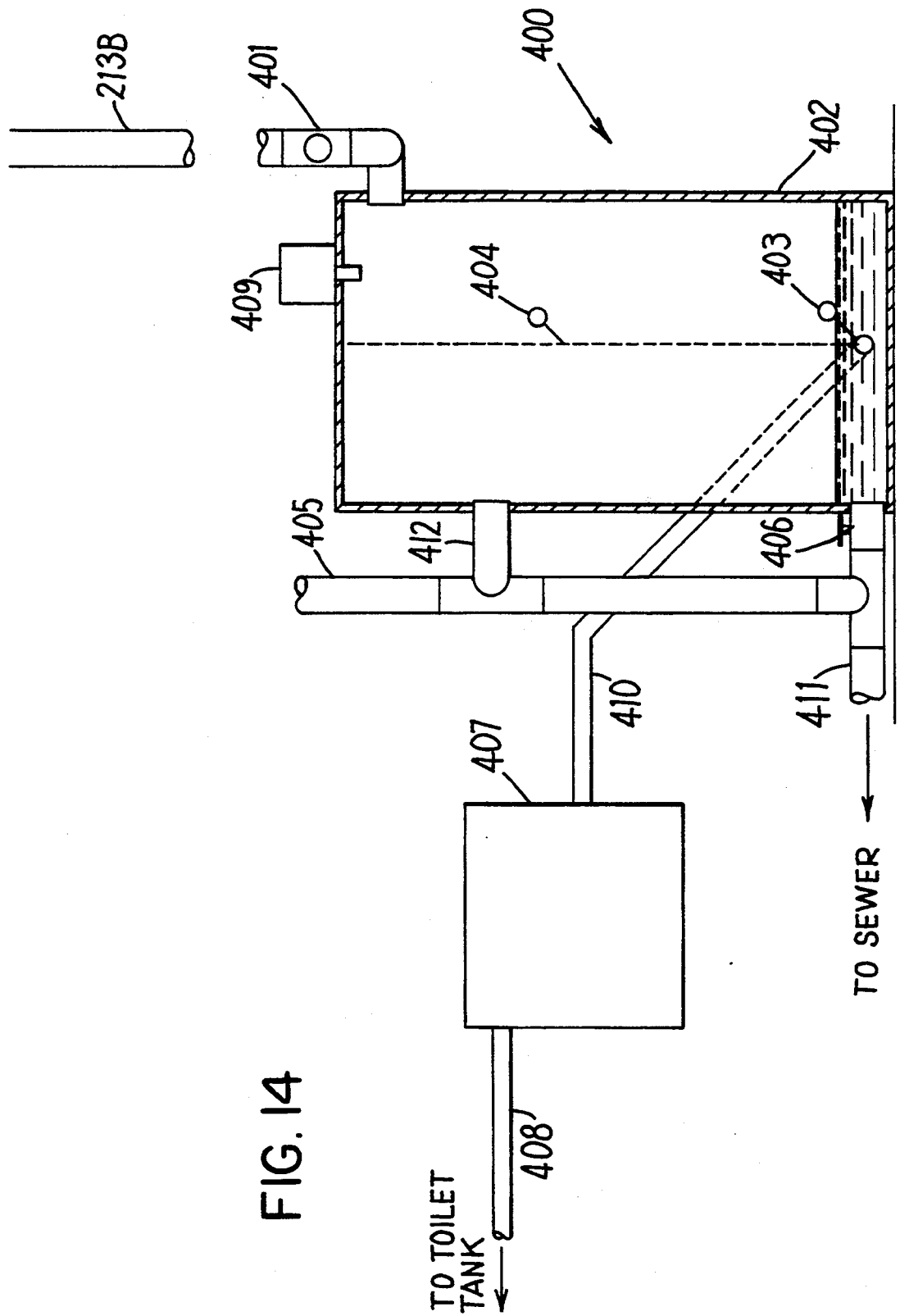
FIG. 14 is a diagram illustration of apparatus for storage of filtered gray water and a pump arrangement for the optional use of the filtered gray water to be used as toilet flush water.

FIG. 14 illustrates an optional storage reservoir tank and demand pump arrangement for filtered gray water intended for toilet water tank reuse purposes. Box 407 is intended to depict the placement of a demand pump between and responsive to a need of water in the toilet water closet and the reservoir tank 402. When needed, pump 407 pumps water from tank 402 through liquid line 410, through pumps 407 through line 408 to the toilet water tank (not shown). Box 409 is intended to depict a system for supplying a bacteriostat into the reservoir 402 as needed. Pipe 411 is used as a drain pipe to the sewer allowing gray water to be removed from reservoir 402 by manual drain valve 406 and/or overflow line 412. In an alternate arrangement of components, the demand pump depicted by box 407 and solenoid valve 401 can be installed in one housing with no change in function.

Figure 2:
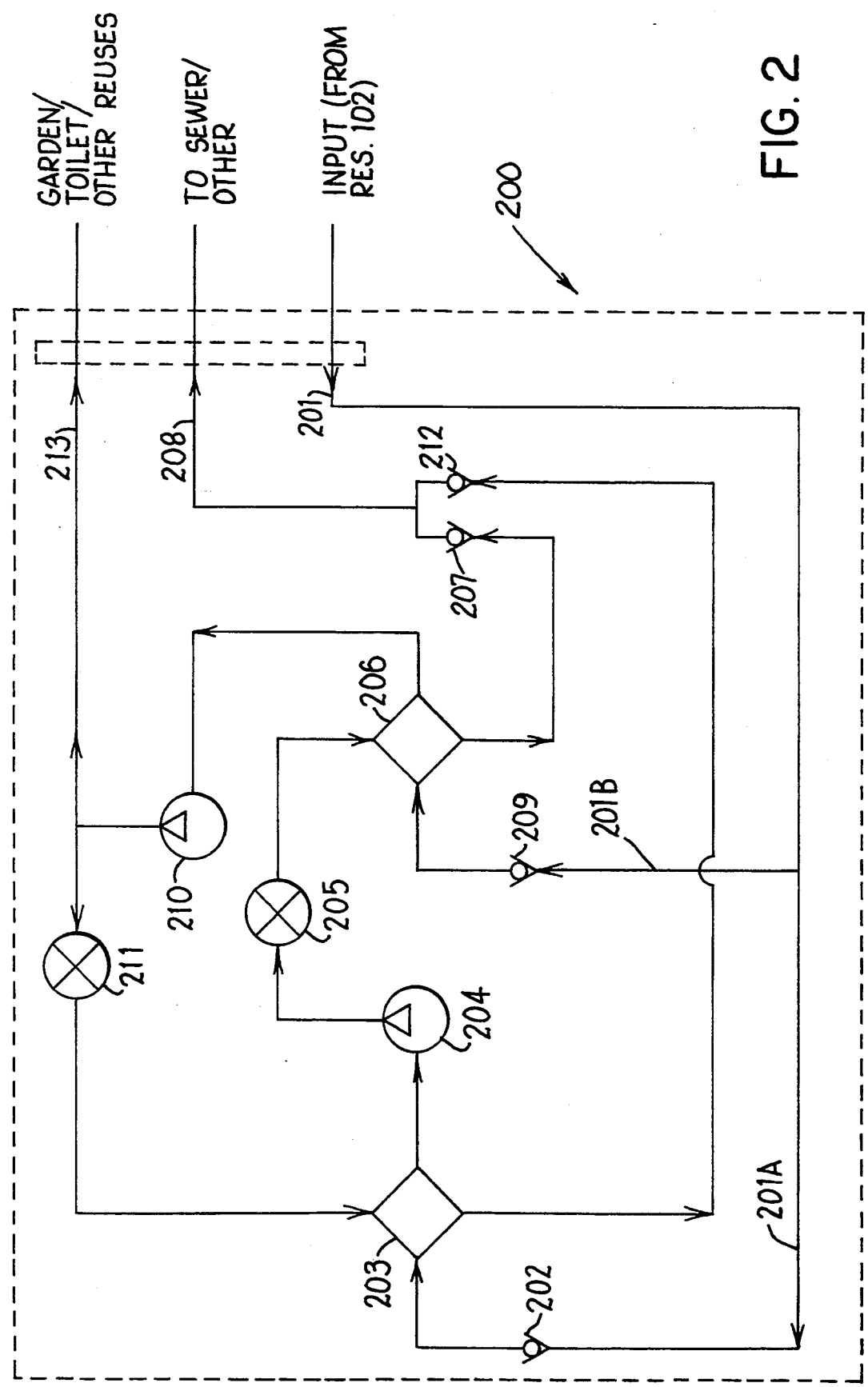
FIG. 2 is a schematic outline of water flow conduit lines and apparatus arrangement of filter, motorized pump, powered valves and check valves as they can be arranged to operate according to the invention in four modes.
Figure 16:
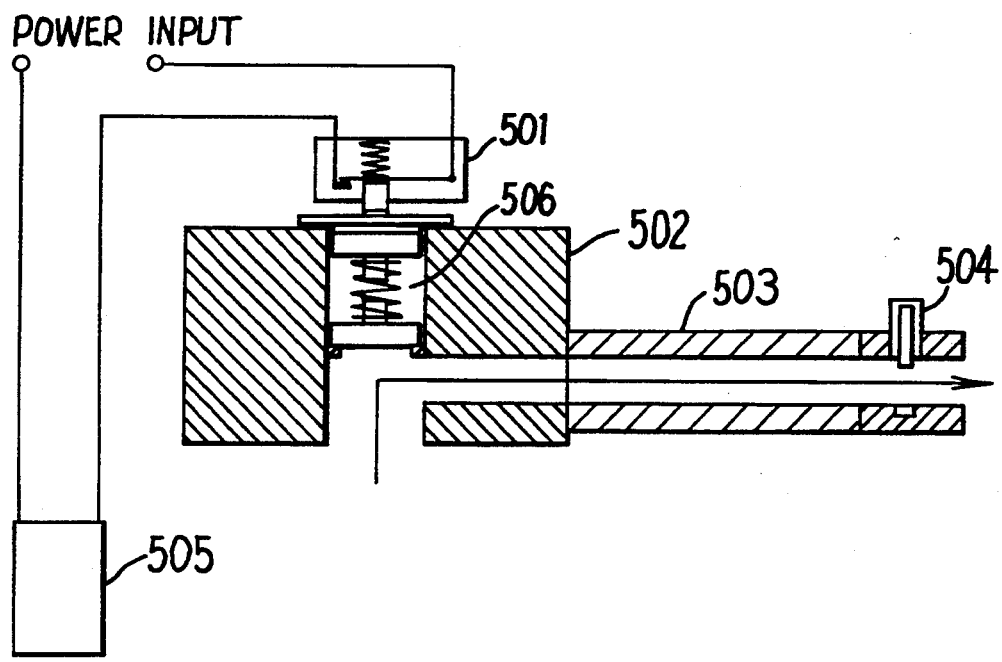
FIG. 16 is a cross section diagram of a pressure switch in the pumps used in this combination, with the water outlet in an open position.
Figure 17:
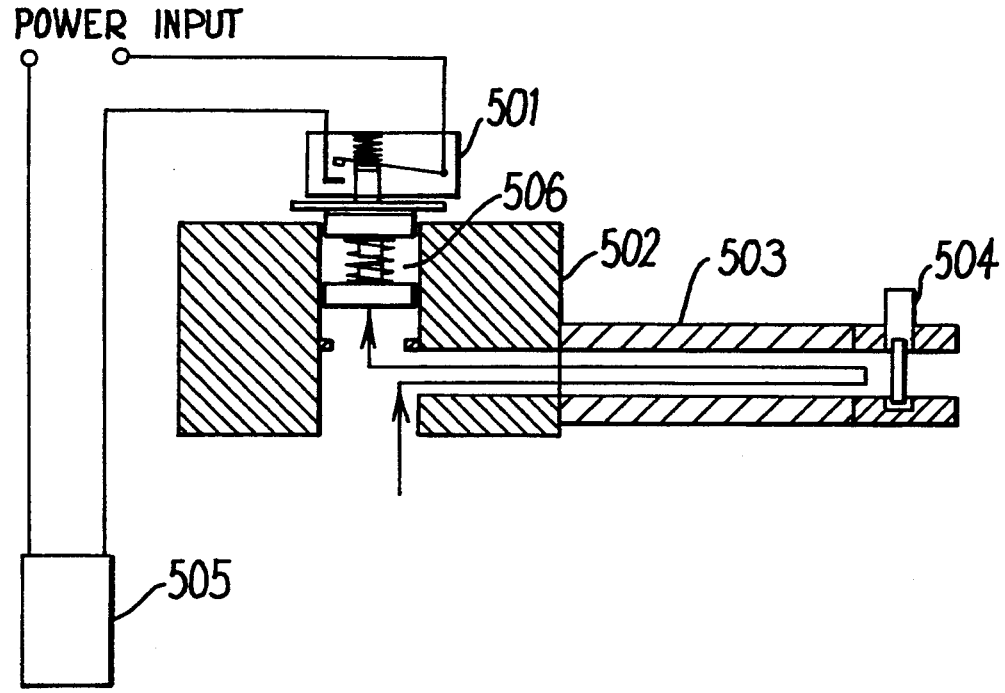
FIG. 17 is a cross section diagram of the pressure switch in the pumps with the water outlet in a closed position.

FIGS. 16 and 17 are an illustration of the pressure switch used in conjunction with the pumps 204 and 210 (FIG. 2). FIG. 16 is illustrative of what occurs when the pumps output does not have any restrictions placed on it. As can be seen in FIG. 16, the switch 501 is closed. This allows power to go to the pump motor 505 that is used in pumps 204 and 210.

In FIG. 17, however, the output of the pumps 204 and 210 (FIG. 2) are prevented from continuing past valve 504. As a result, the pressure inside pump head 502 increases as the pump motor continues to operate. This increasing pressure moves the spring assembly 506 upward and thus pushes the plunger on switch 501 upward. Eventually, the pressure reaches a level where the contact inside switch 501 is broken, e.g., 20 p.s.i. (9.07 kg/square cm) and power is removed/shut off from the pump motor 505 that is used in pumps 204 and 210.

In this way, the pressure output of the pump is maintained and prevented from increasing beyond the level predetermined by the switch 501. In the water reuse device, this allows for power to be made available to the pump motor but the motor/pump combinations output is regulated by the switch 501.

An advantage of the graywater reuse control system of this invention is that it is believed to be the first automatic gray water reuse control system which dedicates one pump and filter combination to the function of backwashing the other gray water filter in the combination. This allows for the automated, long term operation of the system with little manual service activity needed, in a system that does not call for the need for or connection to any additional household potable water supplies.

Presently, in our tests of this gray water reuse control system for family household use applications we use filter screens in the primary (206) and secondary (203) filters which have a 40×40 mesh per linear inch opening (0.0185 inch/0.470 mm width opening with a 0.0065 inch/0.165 mm wire diameter), although we contemplate that the filter screen opening size can vary as might be desirable for any particular type of debris contemplated to be removed from the gray water of the particular installation before reuse of such gray water for any particular contemplated use thereof. The filter 314 (FIG. 1) can optionally be fitted with a different, finer size screen filter, if desired (e.g. an 80×80 mesh per linear inch filter; 0.0088 inch/0.224 mm width opening with a 0.0037 inch/0.0940 mm wire diameter) to remove further finer solids from the gray water which is to be reused for any particular designated purpose, such as irrigation, car washing, etc. We contemplate that the screen opening size selected for use in the primary and secondary filters will be sufficient to collect a substantial part, say at least 45 percent of any solids in said previously used water, but we do not wish to be bound to that figure because the intended reuse of the resulting filtered water will influence the degree of filtering which will be considered desirable for any particular water reuse purpose.

OPERATION OF FULLY AUTOMATIC BACKWASH FILTER

The fully automatic gray water control combination for collecting gray water, filtering the gray water, backwashing the main filter, distributing the filtered gray water to toilet flushing, irrigation or sewer disposition use basically comprises two filters, two pumps, 4 to 8 (standard) normally closed solenoid valves, and a timing mechanism along with other components as shown in the accompanying diagrams. The timing mechanism coordinates the various functions of the automatic backwash filter. These functions, which will be discussed in detail, consist of Mode 1 (FIG. 3), which show the electrical switch settings and cam wheel positions within the timing mechanism for backwashing of filter 206 (FIG. 1) using gray water; Mode 2 (FIG. 4), which show similar timing settings for backwashing of filter 203 using gray water; Mode 3 (FIG. 5), which allows filtered gray water to go to the toilet water tank or to the garden via line 213, or to an alternate outlet such as to a sewer via line 208; and Mode 4 (FIG. 6), which allows for the manual operation of the unit. The timer is designed so that this cycle will continue so long as there is sufficient gray water in the reservoir 102 (FIG. 1). This timing cycle is unaffected by power interruptions.

The supply of gray water enters the reservoir tank 102 (FIG. 1) through pipe 101. Pipe 101 connects the drains from the various gray water sources. When the level in the reservoir tank 102 reaches a level great enough to raise float switch 103 to the "ON" position, power is sent to the fully automatic backwash filter control mechanism/timer 216.

Figure 3:
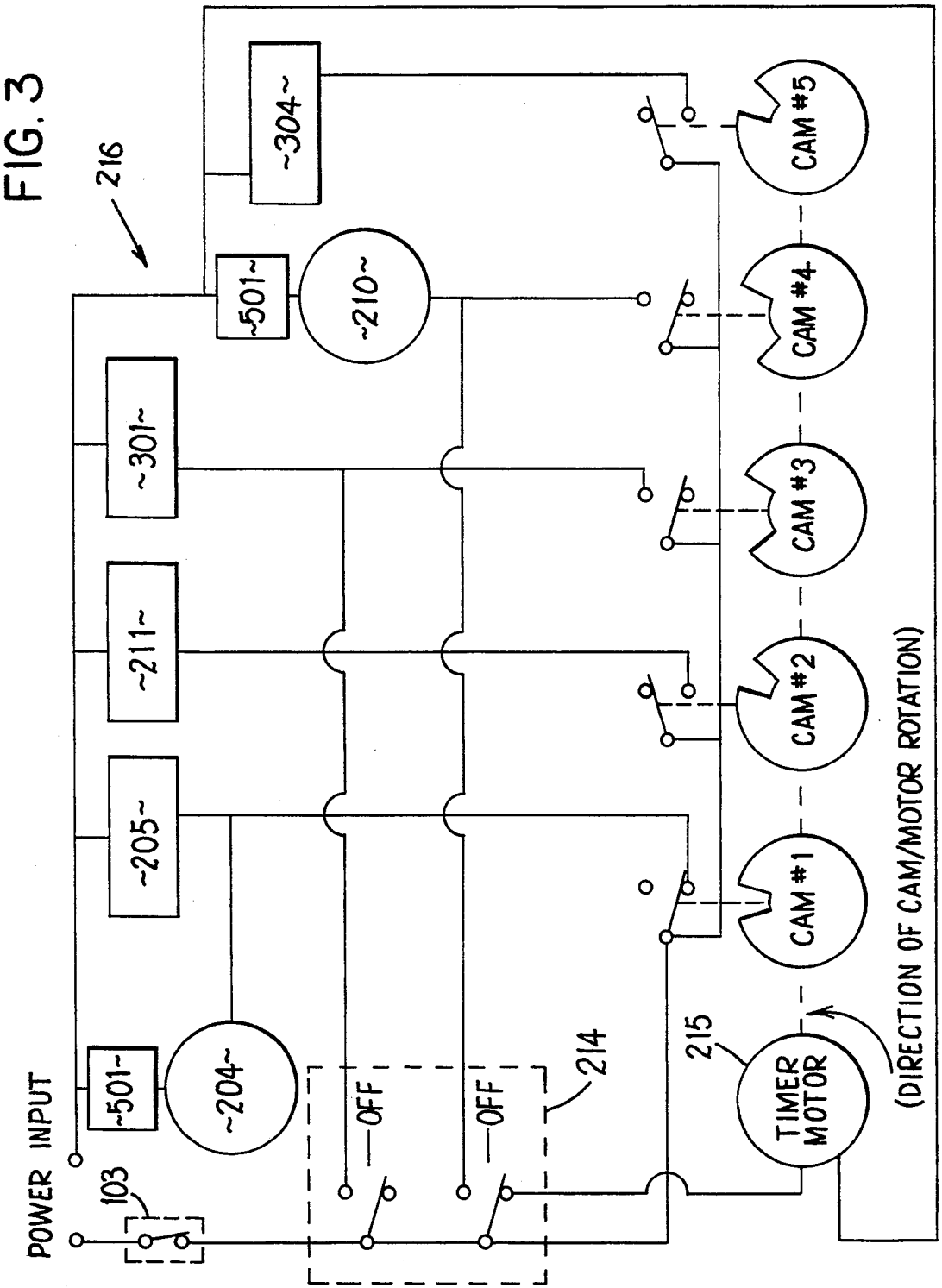
FIG. 3 is a diagram of electrical switch settings and cam wheel positions within the timing mechanism of the water reuse control system of this invention showing typical switch and cam wheel settings when the invention's control system is operating in its mode 1 functions.
Figure 9:
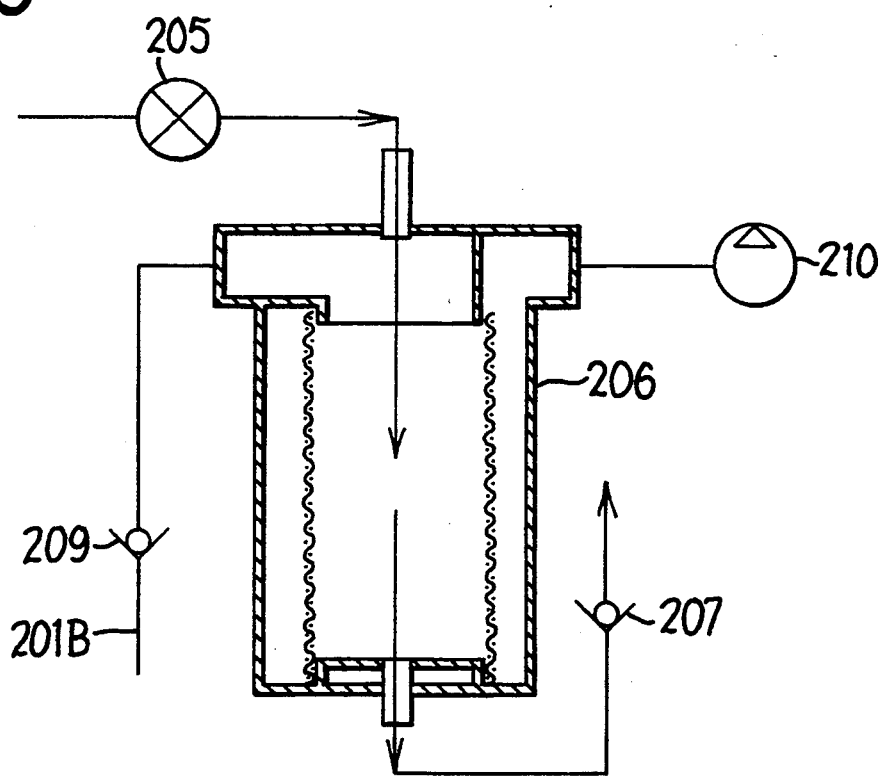
FIG. 9 is a cross section diagram of the main filter showing the entrance and exit path of water used to backwash a screen filter of moveable filtered solids during the backwash mode of the invention's water reuse control system.
Figure 10:
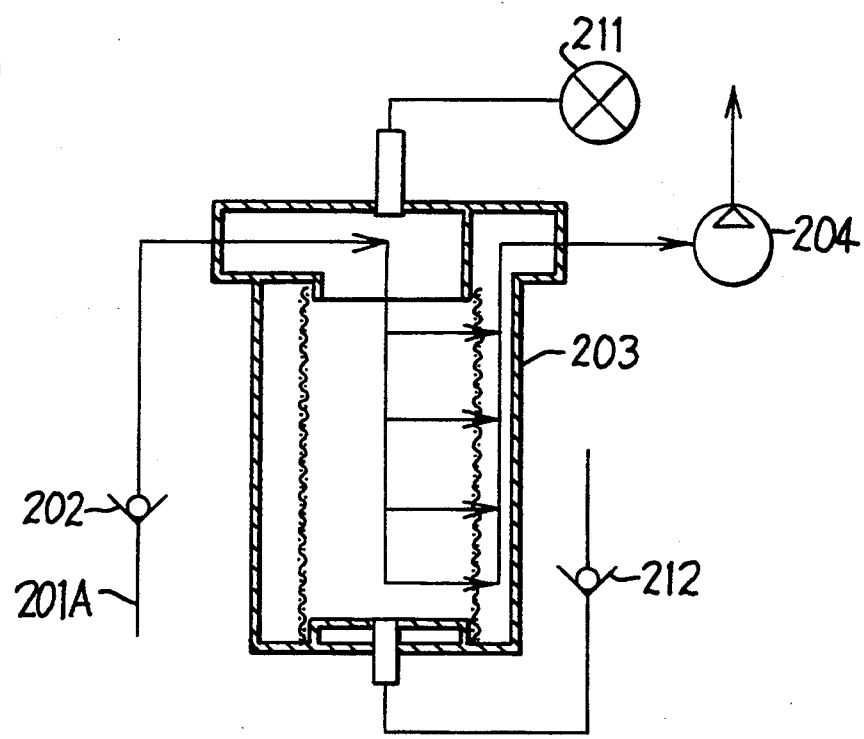
FIG. 10 is a cross section diagram of the secondary filter showing the entrance and exit path of water to be filtered through a typical filter which can be used in the invention system, in it filtration mode.
Figure 11:
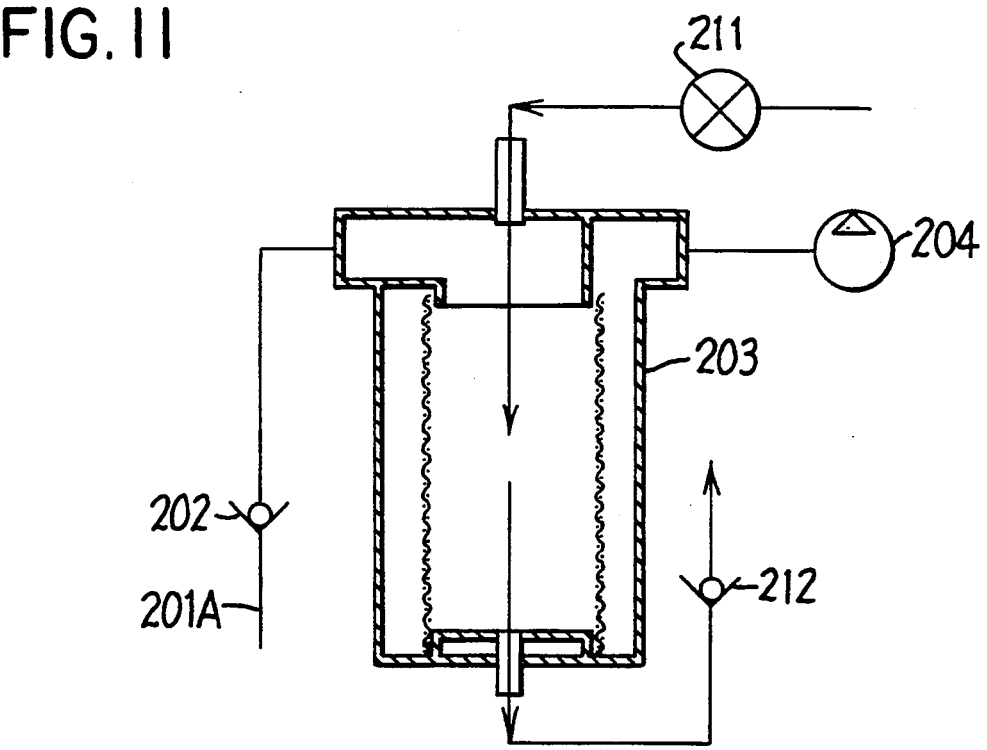
FIG. 11 is a cross section diagram of the secondary filter showing the entrance and exit path of water used to backwash a screen filter of moveable filtered solids during the backwash mode of the invention's water reuse control system.

Mode 1 begins, when the timer cams (FIGS. 3 to 6) reach the correct position as shown in FIG. 3, by sending power to pump motor 204, and to normally closed solenoid valve 205. As shown in FIG. 2, pump 204 draws the gray water through line 201 from the reservoir tank 102, through the line 201A, through check valve 202 and then through secondary filter 203. FIG. 10 shows a cross section of the filter as the gray water goes through it and has any collectible debris filtered out. As shown in FIG. 2, the gray water proceeds to and then exits pump 204, goes through solenoid valve 205 and then through the top of primary filter 206. As shown in FIGS. 2 and 11, the gray water, and any collectible debris found in filter 206, are carried out the bottom of filter 206 through check valve 207, then to the sewer via pipe 208 by the actions of pump 204. FIG. 9 shows a cross section of primary filter 206 as it is being cleaned of any removable debris that has been collected. The gray water is prevented from going in any other direction by various check valves, and solenoid valves.

Figure 4:
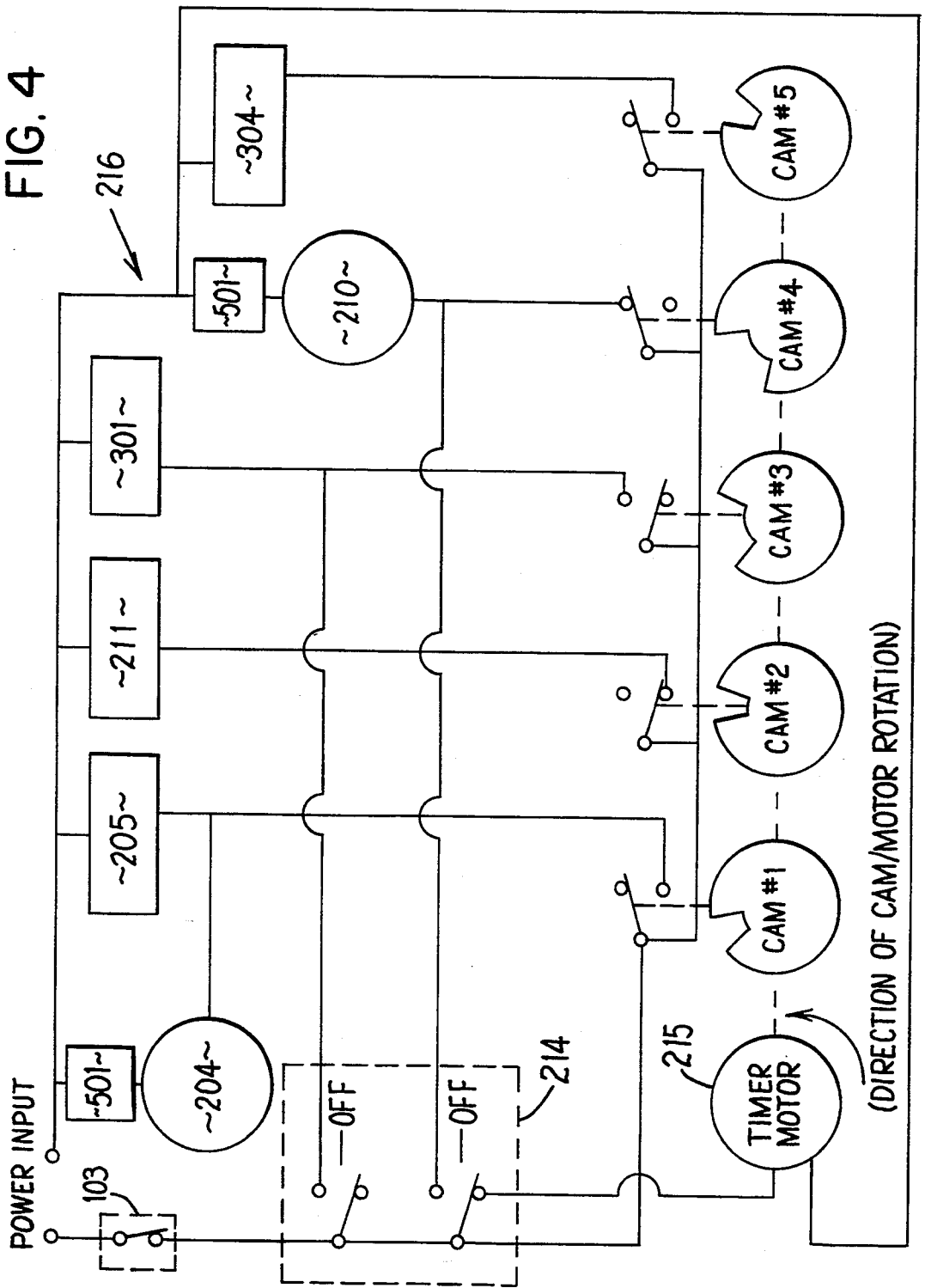
FIG. 4 is a diagram of electrical switch settings and cam wheel positions when the timing mechanism of the water reuse control system showing typical switch and cam wheel settings when the invention's control system is operating in its mode 2 operation.
Figure 8:
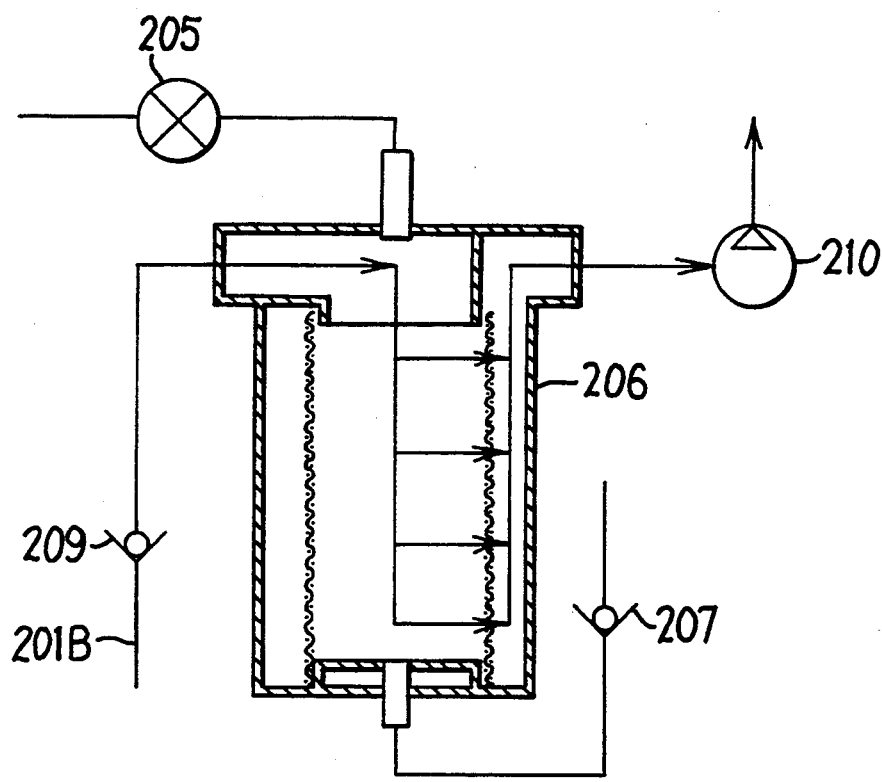
FIG. 8 is a cross section diagram of the main filter showing the entrance and exit path of water to be filtered through a typical filter which can be used in the invention system, in its filtration mode.

After the completion of Mode 1, the timer cams advance and begin Mode 2 as shown in FIG. 4. With the completion of mode 1, power is removed from pump motor 204 (FIG. 2) and solenoid valve 205, and is sent to solenoid valve 211 and pump 210. As shown in FIG. 2, pump 210 draws the gray water through line 201 from the reservoir tank 102, through the line 201B, through check valve 209 and then through primary filter 206. FIG. 8 shows a cross section of the primary filter as the gray water goes through it and has any debris filtered out. As shown in FIG. 2, the gray water proceeds to and then exits pump 210, goes through solenoid valve 211 and then through the top of secondary filter 203. As shown in FIG. 2, the gray water, and any debris found in filter 203, are carried out the bottom of filter 203 through check valve 212, then to the sewer via pipe 208 by the actions of pump 210. FIG. 11 shows a cross section of the secondary filter 203 as it is being cleaned of any debris that has been collected. The gray water is prevented from going in any other direction by various check valves, and solenoid valves.

Figure 5:
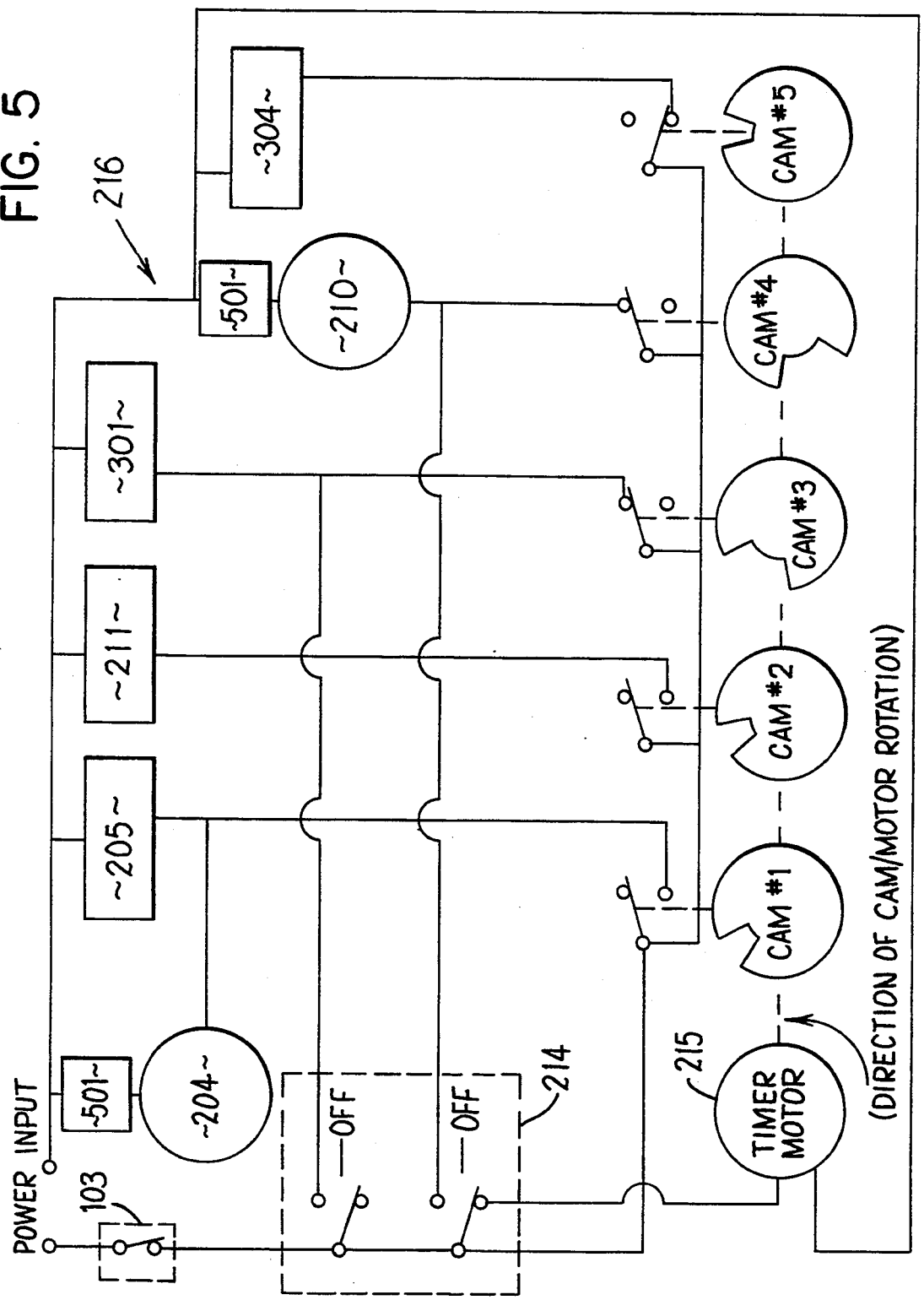
FIG. 5 is a diagram of electrical switch and cam wheel settings when the timing mechanism of the invention control system when the invention control system is operating in its mode 3 stage.

After the completion of Mode 2, the timer cams advance and begin Mode 3. With the completion of Mode 2, power is removed from solenoid valve 211 (FIG. 2) and is sent to solenoid valve 301 as shown in FIG. 5. Pump 210 (Shown in FIGS. 2 and 5) is still in use. Mode 3 allows for the output of filtered gray water to go either to the garden, toilet or to another use location.

Mode 3 operates in the following manner. As shown in FIG. 2, the pump 210 draws the gray water through line 201 from the reservoir tank 102, through the line 201B, through check valve 209 and then through primary filter 206. FIG. 8 shows a cross section of the filter 206 as the gray water goes through it and has any debris filtered out. As shown in FIG. 2, the filtered gray water proceeds to and then exits pump 210 through line 213. As shown in FIG. 1, as one option, the filtered gray water enters solenoid valve 301 from line 213A. From solenoid valve 301, the filtered gray water is distributed to reuse through line 307.

During the time that the gray water is being pumped to the garden through solenoid valve 301, the timer has been designed to flush out the irrigation line for a specific amount of time. This flushing action is accomplished by opening solenoid valve 304. The gray water then flows freely through the irrigation line 307 and out into a leach field 310 or other suitable site via line 316.

To allow for multiple irrigation lines, it is possible to connect more than one irrigation line to the system. As shown in FIG. 1, this is accomplished by connecting solenoid valves 301, 302, and 303 to one end of an irrigation line and flushing valves 304, 305, and 306 to the other end of irrigation line 307, 308, and 309. The output from solenoid valves 304, 305, and 306 is carried to leach field 310 via line 316, 317, and 318 respectively. Each area that is irrigated by line 307, 308, and 309 has been represented in the diagram as 311, 312, and 313 respectively and are referred to as zones. Each zone is run for a specific amount of time as dictated by the timing mechanism. An infinite variety of zone combinations is possible with this arrangement.

Alternately, the output of line 213 can also go to a reservoir tank 402 (FIG. 14) through line 213B for the purposes of storing filtered gray water for toilet flushing. As can be seen in FIG. 14, the filtered gray water enters reservoir tank 402 through solenoid valve 401 after going through line 213B. Solenoid valve 401 is controlled by upper float 404 which is designed to send power to solenoid valve 401 when the gray water level in reservoir tank 402 is below a preset level. This then allows gray water to enter reservoir tank 402 through solenoid valve 401 until the reservoir tank is full as indicated by upper float 404.

Alternately, the output of line 213 can be divided between irrigation system 300 (FIG. 1) and toilet tank reservoir system 400 (FIG. 14). This filtered gray water outlet control is accomplished by controlling both solenoid valve 401 and solenoid valves 301, 302 and 303 by float switch 404. When gray water is required for the reservoir 402 as indicated by float switch 404, power is sent to solenoid valve 401 and is removed from solenoid valves 301, 302 and 303. When reservoir 402 is full as indicated by float switch 404, power is removed from solenoid valve 401 and is restored to solenoid valves 301, 302 and 303.

Figure 15:
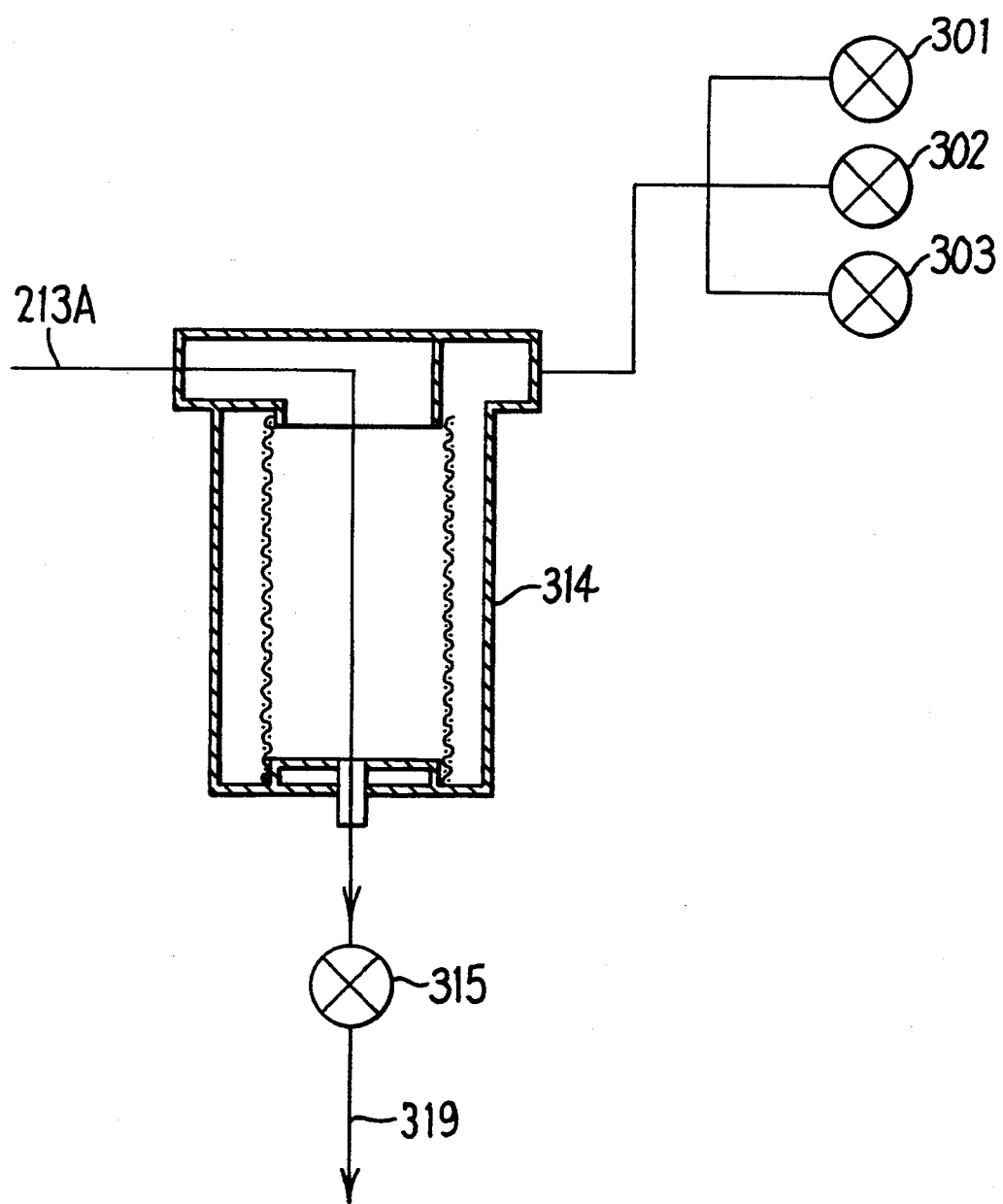
FIG. 15 is a cross section diagram of the optional filter for the garden showing the entrance and exit path of filtered gray water used to backwash a screen filter of moveable filtered solids during the backwash mode of the device.

Mode 3A is an option designed to allow for finer filtration of debris found in the gray water. An additional filter 314, as shown in FIG. 1, is connected to line 213A before it enters solenoid valves 301, 302 and 303. It is automatically cleaned after the timing mechanism has sent filtered gray water through solenoid valves 301, 302 and 303. After power is removed from solenoid valves 301, 302 and 303, power is sent to solenoid valve 315. Power is still present for pump 210 (FIG. 2). The filtered gray water enters filter 314 and exits the bottom of filter 314 as shown in FIG. 15. In this way, any accumulated debris found in filter 314 is removed to the sewer or a suitable location by the actions of pump 210.

Mode 4 is a period of inactivity for the filter mechanism. This mode is designed to allow the manual operation of the unit if desired. As shown in FIG. 6, switch 214 has been shown in the manual "ON" position. In this way, it is possible to irrigate one zone by power being sent to solenoid valve 301 and pump motor 210. It is also possible to remove power to timer motor 215 by moving switch 214 to the "OFF" position. This is necessary when starting up the unit.

As noted above, the timing mechanism will continue to operate so long as power is available. Upon disruption of power, the timer will cease to function but will maintain its place in the sequence so that when power is restored, it will begin where it ended when power was disrupted.

FIG. 7 shows the electrical arrangement for a system with 8 timing cams. Cam number 1 through 4 are designed to allow the unit to function in Modes 1 through 4. Cam number 6 and 7 allow for the control of two additional solenoid valves, number 302 and 303 which allow for two additional irrigation lines. Cam number 5 is designed to operate solenoid valves 304, 305 and 306 which function as drain valves for irrigation lines 307, 308 and 309 respectively. Cam number 8 controls solenoid valve 315 and is designed to coordinate and allow for the backwashing of filter 314.

PROTOTYPE INFORMATION

In the model that has been used and is currently being used for test purposes, the type of pumps that we are currently using are of a type referred to as demand pumps. The reason for this is that they have a pressure switch built into the head of the pump that is responsive to the pressure of the output of the pump and controls the power going to the motor of the pump. When the pressure reaches a certain level due to the fact that the output is restricted or prevented from leaving the pump head, the pressure switch shuts off and power is removed from the pump motor. The reference to demand pump comes from the fact that they will begin to operate as soon as a demand is present. This demand can come in many forms but all constitute an outlet for the output of the pump. The pump currently in use has the capacity to pump 2.8 gallons per minute when no restrictions are placed on the output of the pump. The pressure switch is adjustable and is currently set at 20 pounds per square inch.

The type of filters used on the prototype are of the in-line variety. For the primary and secondary filter they contain a 40 mesh stainless steel filter inside the plastic housing. The optional filter for the garden uses an 80 mesh filter screen. The housing is constructed in two pieces consisting of an upper and lower half. This allows for removal of the filter during annual maintenance.

The timer is of the cam or lobe type. Currently, an 18 minute cycle is used. The motor that drives the shaft that interconnects all the cams operates continuously, as long as power is present. The 18 minute cycle is broken down in the following way;
Mode 1: 1 minute duration
Mode 2: 1 minute duration
Mode 3: 14 minute duration
Mode 3A: 1 minute duration
Mode 4: 1 minute duration Each of the solenoid valves 304, 305 and 306 are open for approximately 30 seconds during the time that filtered gray water is flowing through irrigation lines 307, 308 and 309.

The function of each cam is as follows:
Cam 1: Controls pump 204 and solenoid valve 205
Cam 2: Controls solenoid valve 211
Cam 3: Controls solenoid valve 301
Cam 4: Controls pump 210
Cam 5: Controls solenoid valve 304,305, & 306
Cam 6: Controls solenoid valve 302
Cam 7: Controls solenoid valve 303
Cam 8: Controls solenoid valve 315

The unit begins operation by having gray water enter reservoir 102. When the level of gray water is sufficient in reservoir 102 to raise float switch 103 to the "on" position, power is sent to control mechanism/timer 216. The timer motor begins to rotate which in turn begins the movements of the cams located along the drive shaft coupled to the motor.

Mode 1 begins with the backwashing of the main filter 206 via the output of pump 204 which draws gray water through input line 201, check valve 202 and filter 203. Filtered gray water exits filter 203, enters pump 204, exits pump 204 and goes through solenoid valve 205. From there it enters the top of filter 206, exits the bottom of filter 206, goes through check valve 207 and finally to the sewer via line 208. The entire process takes 1 minute to remove the majority of debris found in filter 206. There is a brief pause of approximately 10 seconds or less between modes 1 and 2 which allow for the closing of solenoid valve 205 and the removal of power from pump 204 and the sending of power to pump 210 and solenoid valve 211.

Mode 2 begins with the backwashing of the secondary filter which was used in Mode 1 for 1 minute. It begins by pump 210 drawing gray water from reservoir 102 through input line 201, check valve 209 and filter 206. Filtered gray water exits filter 206, enters pump 210 and goes through solenoid valve 211. From there it enters the top of filter 203, exits the bottom of filter 203, goes through check valve 212 and finally to the sewer via line 208. The entire process takes 1 minute to remove the majority of debris found in filter 203. There is a brief pause between Mode 2 and 3. This pause is approximately 5 seconds in duration and allows power to be removed from solenoid valve 211 and power to be sent to solenoid valve 301. Power is not removed from pump 210 and due to the short amount of time present between the change of outlets for the pump 210, it usually does not reach maximum pressure and shut off.

Mode 3 begins by sending the output of pump 210 through line 213A, filter 314 then solenoid valve 301 after it draws gray water from reservoir 102, through check valve 209, filter 206, and pump 210. The gray water exits outlets in irrigation line 307. Currently, different types of drip irrigation are being evaluated. Solenoid valve 301 is open for approximately 4.6 minutes. This is arrived at by dividing the 14 minutes allotted to Mode 3 equally between the 3 zones. It is quite clear that this can be easily changed so that a lesser or greater number of zones are possible and the amount of time per zone can be adjusted as required based on the amount of filtered gray water that is required for the specific application. Approximately 3 minutes into the 4.6 minutes allotted for solenoid valve 301 to be open, solenoid valve 304 is opened. This allows filtered gray water to exit from irrigation line 307 via solenoid valve 304. This allows for the removal of any debris that has passed through the filter to be removed to leach field 310. Solenoid valve 304 is open for approximately 30 seconds. (As will be noted in FIG. 7, when power is sent to solenoid valve 304 power is also sent to valves 305 and 306. The reason for this is to reduce the number of cams present in the invention. Since solenoid valves 302 and 303 are closed at the time that the respective valves 305 and 306 are open, no pump output is sent through irrigation lines 308 and 309). Mode 3 continues by the closing of solenoid valve 301 and the opening of solenoid valve 302. The operation of solenoid valve 302, irrigation line 308 and dump valve 305 is identical to the description above and this sequence is run for approximately 4.6 minutes. Mode 3 concludes with the operation of solenoid valve 303 for approximately 4.6 minutes after power is removed from solenoid valve 302. Solenoid valve 303, irrigation line 309 and solenoid valve 306 operate in the same manner as those above.

Mode 3A, which is the cleaning of the optional filter 314, begins after power is removed from solenoid valve 303 at the conclusion of Mode 3. (Note: If optional filter 314 is not present, 1 minute is added to Mode 3 or 4). Mode 3A begins with power being sent to solenoid valve 315. Pump 210 is still in operation. Filter 314, which has now been in use for approximately 14 minutes, is backwashed by allowing filtered gray water to be drawn through pump 210 as in Mode 3, but now the water exits out the bottom of filter 314 via solenoid valve 315. The gray water, which now contains debris from filter 314 is sent to the sewer via line 319. The solenoid valve 315 is open for approximately 1 minute. At the conclusion of Mode 3A, power is removed from solenoid valve 315 and pump 210.

Mode 4 is a period of inactivity which is 1 minute in length and is designed to allow for the manual operation of the unit if the timing device malfunctions in some way or manual operation is desired for some other reason. If manual operation is not desired, then after the 1 minute period of inactivity it will begin Mode 1. Manual operation is accomplished by moving switch 214 as shown in FIGS. 3-7 first to the "off" position. This removes power from the timer motor. By removing power from the timer motor, the cams will remain in the position that they are at the time power is removed. Therefore, no other solenoid valves or pump motors are operating at this time. If power is removed at any time other than during Mode 4, the unit will continue to operate in the mode that it was in at the time power is removed. (This is not to be confused with the removal of power when there is insufficient gray water in reservoir 102. At that time, switch 103 will remove power from timer mechanism 216. However, when sufficient gray water is put into reservoir 102 to allow power to go through switch 103, the timer motor will receive power and begin to move the cams). Then, switch 214 is moved to the 2nd "on" position, or as shown in the diagram, the upper set of switch contacts. This allows power to go to solenoid valve 301 and pump 210. This will allow for the operation of irrigation line 307 only. This manual switch is designed to be used only in emergency situations when the unit does not function properly and water is required in the garden/toilet. When in manual mode, filter 206 will be in use but will not be cleaned automatically. It will need to be cleaned manually on a regular basis during the time the unit is being operated manually.

The cycle begins again with mode 1. As described above, filter 206 will have debris removed via pump 204, solenoid valve 205 and filter 203 (which is now free of the majority of the debris deposited on the screen after its last use). As noted above, filter 206 will have approximately 16 minutes of operation time and a corresponding amount of debris deposited on the filter screen.

We claim:

1. A water reuse control system arranged for supplying water derived from a prior water point of use to a point of water reuse, said water reuse control system comprising in combination;
   a) a reservoir (102) for storing water to be reused,
   b) a switch means (103) for controlling the level of water in said reservoir (102),
   c) an automatically controllable electrical power timing mechanism (200), primary screen filter (203) and primary motorized pump (204) and primary powered valve (205) control combination which can be activated to an "ON" position by said switch means (b), for the purpose of filtering water which is then used to clean a secondary screen filter (206) in a timed power sequence,
   d) said control combination (c) also including connections for a secondary motorized pump (210), a secondary powered valve (211) and said secondary screen filter (206) for the purpose of filtering water which is then used to clean said primary screen filter (203) in a timed power sequence,
   e) said control combination having several automatically controllable modes, which when said control combination has been activated to an "ON" condition includes:
      1) a first mode of operation which activates said primary motorized pump (204) and said primary powered valve (205) to draw previously used water from said reservoir (102) through liquid holding conduits and a check valve (202) connecting said reservoir (102) to said primary screen filter (203) and primary motorized pump (204) to direct said previously used water from top to bottom through the central region of the primary screen filter (203) to separate filterable solids from said previously used reservoir water and from inside surfaces of said primary screen filter (203) to draw the resulting first filtered water via liquid conduits through the primary motorized pump (204) of said water reuse control system to transport said first filtered water through said primary powered valve (205) and then through inside surfaces of the secondary screen filter (206) from top to bottom to clean the inside surfaces of said secondary screen filter (206) of filterable solids, the resulting second filtered water (from secondary screen filter (206) containing any moveable filtered solids being diverted through liquid conduits and check valve (207) to waste disposal, to complete the first mode operation;
      2) a second mode of operation activated by timer advancement in which power is removed from said primary motorized pump (204) and primary powered valve (205) and power is sent to said secondary powered valve (211) and said secondary motorized pump (210) to draw previously used water from said reservoir (102) through a water conduit and a check valve (209) and through the central region from top to bottom of said secondary screen filter (206) to advance the resulting secondary screen filter water (from secondary screen filter 206) through said secondary motorized pump (210) and through conduits connecting in line said secondary pump (210) and said secondary powered valve (211) so as to flow from top to bottom through said primary screen filter (203) to clean the inside surfaces of said primary screen filter (203) of filterable solids, so that an effluent water/filterable solid mixture from said primary screen filter (203) is carried through conduits and a check valve (212) to waste disposal, to complete the second mode of operation;
      3) a third mode of operation activated by timer advancement in which power is removed from said secondary powered valve (211) while said secondary motorized pump (210) is still in operation to redirect and pump filtered water from at least one of said filters to reuse end points, for a time and in an amount sufficient to complete an end use purpose and having a;
      4) a fourth mode of operation activated by timer advancement which removes power from said water reuse control system (200) to allow an operation selected from the group consisting of,
         4a) a timed rest period before an automatic mode of operation is resumed; and
         4b) manual operation to allow for selective manual bypassing of the timing mechanism so as to use said reservoir water for an extended selected purpose.

2. A water reuse control system as described in claim 1 wherein the control system of claim 12 is applied to control reuse of gray water.

3. A water reuse control system according to claim 1 in which the primary and secondary screen filters which are in the water reuse control system are screens having a hole size sufficient to collect a substantial part of any solids in said prior point of use water.

4. A water reuse control system as described in claim 1 wherein said switch means (b) system is a float switch in said reservoir (a), said float switch being activated by a predetermined water level in the reservoir.

5. A water reuse control system according to claim 1 wherein said reservoir (a) is provided with a means to activate a drain of water from said reservoir (a) when the water level in said reservoir (a) reaches a predetermined high water reservoir level.

6. A water reuse control system according to claim 1 wherein the control system is set to operate automatically in a timed cycle sequence to control the first through fourth modes of operation of the control system unit, and wherein the electrical power to be supplied to said control system is controlled by a switch means responsive to the level of water in the reservoir (a).

7. An automatically controlled water reuse control system according to claim 6 in which the timing mechanism is designed to operate only in a preset sequence of modes of operation.

8. An automatically controlled water reuse control system according to claim 6 in which the timing mechanism is adjustable to vary the amount of time each mode of operation is to operate before proceeding to a subsequent mode of operation.

9. A water reuse control system according to claim 6 which further includes pressure switches for each of said primary and secondary motorized pump to effect automatic pump motor shutoff control for each of said pumps.

10. A water reuse control system according to claim 1 wherein the control system further includes conduit means from said secondary screen filter used in conjunction with said secondary motorized pump, to remove and direct the resulting filtered water from said secondary screen filter to water reuse outlets directed to irrigation uses.

* * * * *